Figure 1:
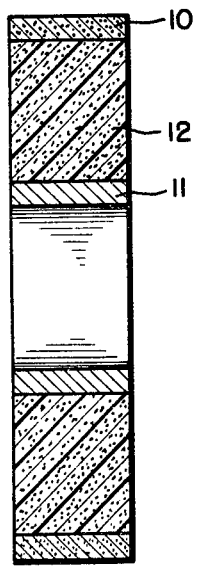

March 17, 1970  G. E. MYERS  3,501,280
SLITTER KNIVES
Filed Oct. 21, 1959

INVENTOR.
George E. Myers
BY *Webb, Mackey & Burden*
HIS ATTORNEYS

3,501,280
SLITTER KNIVES

George E. Myers, McKeesport, Pa., assignor to Metal Carbides Corporation, Youngstown, Ohio, a corporation of Ohio
Filed Oct. 21, 1959, Ser. No. 847,836
Int. Cl. B26d 1/00; C08h 17/12
U.S. Cl. 51—298        4 Claims This invention relates to slitter knives. More specifically, it relates to slitter knives of the built-up type in which the cutting blade is of one material, for example, tungsten carbide, and the supporting member is of another softer material.

Strip metal in narrow widths has always had many varied uses. Originally, it was rolled in the desired widths. Frequently, however, it was necessary to roll the strip slightly wider than the desired end product in order that wrinkled edges, which often arose during the rolling process, could be removed. Such edge trimming was the first major use for slitter knives. The development of rolling mills capable of rolling strips of substantial widths greatly expanded the field of use of slitter knives. It made it economically desirable, if not necessary, to take the wide strip and slit it to produce the narrow strip required for many end uses. In this manner, one rolling operation produced several coils of finished product and the losses resulting from edge trimming, both in time and material, were greatly reduced.

The majority of slitter knives used have had steel blades. While these perform satisfactorily on soft materials, the life of a steel blade is short, particularly when hard materials such as razor blade, high carbon, spring, stainless and silicon steels are slit. Tungsten carbide blades have been used with great success in these fields, yielding not only longer life but cleaner edges and less scrap loss. Nevertheless, their use has been limited due to the high cost of such blades. Two principal types of slitter knives having tungsten carbide blades are currently used. Slitter knives of small widths (⅜″ and less) have been made of solid tungsten carbide. Such knives obviously have in them a substantial amount of expensive tungsten carbide which does not serve to perform any of the cutting operation and has to be scrapped or reclaimed after the knife has worn to a certain extent. A tungsten carbide rim is mechanically mounted on a steel hub for knives ½″ and wider. In these structures, a screw clamp holds the tungsten carbide rim in position. Although there is less unusable carbide in such structures, the expense of manufacturing and assembling this type is high.

My invention substantially reduces the cost of slitter knives having tungsten carbide or other hard metal carbide blades without decreasing their strength. It provides a knife which has a tungsten carbide blade or rim separated from and bonded to a hardened steel bushing by a supporting member consisting of powdered metal and plastic hardened or set to the extent desired for the type of service for which the knife is to be used. In addition to materially reducing the cost of such knives, my invention provides a knife which is somewhat more flexible or resilient than knives made entirely of tungsten carbide and, hence, is less likely to break due to shocks encountered when in service. While the built-up type of knife in which a tungsten carbide rim is mounted on a steel hub has somewhat greater flexibility or resilience than the solid type, and, hence, is not quite as susceptible to breakage resulting from shock, the blade which I provide is superior to the built-up type from this standpoint and is of such character that, within limits, any desired degree of flexibility or resilience can be obtained readily during the manufacturing operation.

Figure 2:
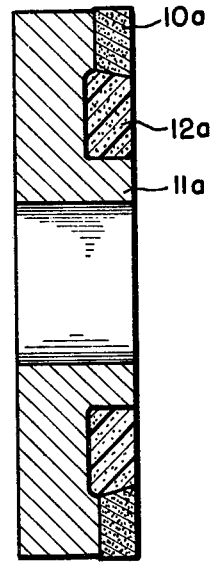

I have shown the present preferred embodiment of my invention in the accompanying drawing in which:

FIGURE 1 is a vertical section through a slitter knife embodying my invention; and FIGURE 2 is a view similar to FIGURE 1 showing an alternative embodiment of my invention.

Referring to FIGURE 1, a slitter blade embodying my invention comprises a tungsten carbide cutting rim 10 mounted on a hardened steel bushing 11 by means of a supporting member 12. The width of the supporting member can be varied to provide a knife of any given diameter.

The supporting member must form a strong bond with both the tungsten carbide cutting rim and the steel bushing, it must possess substantial strength, particularly under compression, and it should not shrink during curing. These properties are obtained by using a mixture of powdered or finely-divided metal, such as steel or aluminum, and an epoxy or epoxy-polyamide resin. These resins have excellent dimensional stability during the curing process and provide a strong bond with the rim and the bushing. When coupled with powdered metal, they yield a supporting member with excellent compressive strength. I have found that a mixture of 80% powdered steel and 20% resin works very satisfactorily. However, these proportions may be varied depending on the strength desired. In order that the resin be liquid at room temperature and thus form a putty-like substance when mixed with the powdered steel, I prefer to use resins having an epoxide equivalent (grams of resin containing one gram equivalent of epoxide) of 400 or less.

In manufacturing my improved slitter knife, the steel bushing and carbide rim are placed on a graphite mold and held firmly in position. The putty-like mixture of resin and powdered steel is placed between the rim and the bushing and compacted so as to completely fill the area between them. It is then placed in an oven at about 300° to 400° for a short time until the material is hardened to around 30 Rockwell C or harder.

In FIGURE 2, I have shown an alternative embodiment of my invention in which the cutting blade is on the side of the rotary wheel. In this embodiment, a steel bushing 11a having a diameter equal to the desired diameter of the wheel is used. One side of this bushing is cut out around the outer periphery. A carbide rim 10a is fit in the outer position of the cut-out. The remainder of the cut-out is filled with a supporting member 12a of resin and powdered metal composed as discussed above.

In both embodiments, the tungsten carbide rim is made in the conventional manner using nickel or cobalt as the bond material.

While I have described the present preferred embodiments of my invention, it is to be understood that it may otherwise be embodied within the scope of the following claims.

I claim:

1. A rotary slitter knife for slitting metal strip and sheet comprising a bonded hard metal carbide rim as the cutting element of said knife, said rim being mounted on a metal bushing by a supporting member disposed between at least a part of said bushing and said rim, said supporting member consisting essentially of a hardened material of a powdered metal and an epoxy resin, said resin being characterized by high dimensional stability during curing and good bonding properties, said supporting member effecting a bond with said rim and said bushing.

2. The knife of claim 1 wherein said resin has an epoxide equivalent no greater than 400.

3. The knife of claim 1 wherein said supporting member is substantially about 80% powdered metal and substantially about 20% resin, said powdered metal being selected from a group consisting of steel and aluminum.

4. The knife of claim 1 wherein said bonded hard metal carbide consists essentially of tungsten carbide and said resin has an epoxide equivalent no greater than 400.

References Cited

UNITED STATES PATENTS

| | | | |
|---|---|---|---|
| 2,862,806 | 12/1958 | Nestor | 51—298 |
| 2,189,734 | 2/1940 | Kistler | 51—298 |
| 2,150,886 | 3/1939 | Ryl | 51—298 |
| 2,070,734 | 2/1937 | Voegelli-Jaggi | 51—298 |
| 2,121,656 | 6/1938 | Fischer | 51—298 |
| 2,598,649 | 5/1952 | Rintoul | 83—663 |
| 2,894,583 | 7/1959 | Johnstad | 83—663 |
| 1,902,513 | 3/1933 | Meutsch | 76—101 |
| 1,926,330 | 9/1933 | Cotton | 76—101 |

DONALD J. ARNOLD, Primary Examiner

U.S. Cl. X.R.

51—309; 83—676